United States Patent [19]
Cadou et al.

[11] Patent Number: 5,620,085
[45] Date of Patent: Apr. 15, 1997

[54] SPLICED CONVEYER BELT ASSEMBLY

[75] Inventors: Peter B. Cadou, Chagrin Falls; John C. Homer, III, Newbury; Robert J. Torok, Kirtland, all of Ohio; William J. Nissen; Lloyd T. Ludolph, both of Cedar Rapids, Iowa

[73] Assignee: General Signal Corporation, Stamford, Conn.

[21] Appl. No.: 596,453

[22] Filed: Feb. 2, 1996

[51] Int. Cl.⁶ ............................................. B65G 15/30
[52] U.S. Cl. ........................................... 198/844.2
[58] Field of Search .................. 198/844.2; 474/257, 474/255; 24/33 B, 33 C

[56] References Cited

U.S. PATENT DOCUMENTS

| | | |
|---|---|---|
| 2,984,594 | 5/1961 | Runton . |
| 3,076,736 | 2/1963 | McHugh . |
| 3,693,218 | 9/1972 | Jaubert et al. . |
| 3,737,954 | 6/1973 | Tabler ........................ 198/844.2 X |
| 3,783,704 | 1/1974 | Lawson . |
| 3,967,720 | 7/1976 | Arieh . |
| 3,998,986 | 12/1976 | Williams . |
| 4,031,767 | 6/1977 | Guyer . |
| 4,034,617 | 7/1977 | Guyer . |
| 4,344,209 | 8/1982 | Harwood ..................... 198/844.2 X |
| 4,474,289 | 10/1984 | Densmore ................... 198/844.2 X |
| 4,596,540 | 6/1986 | F'Geppert . |
| 4,671,403 | 6/1987 | Schick ........................... 198/844.2 |
| 5,048,675 | 9/1991 | Nadalutti ....................... 198/844.2 |
| 5,095,590 | 3/1992 | Schick . |
| 5,135,644 | 8/1992 | Süsse . |
| 5,234,101 | 8/1993 | Herold . |
| 5,238,537 | 8/1993 | Dutt . |
| 5,348,143 | 9/1994 | Musil et al. . |

FOREIGN PATENT DOCUMENTS

| | | | |
|---|---|---|---|
| 1099993 | 9/1955 | France ........................ 198/844.2 |
| 1278029 | 10/1961 | France ........................ 198/844.2 |
| 1323704 | 3/1963 | France ........................ 198/844.2 |
| 2377560 | 9/1978 | France ........................ 198/844.2 |
| 3843872 | 6/1990 | Germany .................... 198/844.2 |
| 4012877 | 10/1991 | Germany .................... 198/844.2 |
| 1102993 | 2/1968 | United Kingdom ......... 198/844.2 |

*Primary Examiner*—D. Glenn Dayoan
*Attorney, Agent, or Firm*—Ohlandt, Greeley, Ruggiero & Perle

[57] ABSTRACT

A spliced conveyer belt assembly having a belt which includes: first and second belt ends; a load carrying ply which is coextensive with the full length of the belt; first and second reinforcing plies spaced from the load carrying ply, the first and second reinforcing plies being disposed adjacent to the first and second belt ends, respectively; and a hinged joint having a plurality of first belt end fasteners and second belt end fasteners, each belt end fastener including first and second apertured plates disposed respectively adjacent to the respective sides of the belt at the respective first and second belt ends, and a bight capable of connecting the first apertured plate to second apertured plate; at least one securing device which is capable of extending through the apertures in the first and second apertured plates and through the belt; and a hinge pin extending through the bights of the first and second belt end fasteners.

18 Claims, 4 Drawing Sheets

SPLICED CONVEYER BELT ASSEMBLY

FIELD OF THE INVENTION

This invention relates to a spliced conveyer belt assembly. More specifically, the invention relates to a belt having a joint in which an endless belt is formed by means of a joint and a pair of short reinforcing plies disposed immediately adjacent the joint which is particularly useful in a gravimetric feeder.

BACKGROUND OF THE INVENTION

In dealing with conveyer belts, especially belts in gravimetric feeder systems having weighing functions, it is paramount that the belt be extremely flexible so that in the weighing zone the proper impact of weight can be fully transmitted through the belt. The most flexible belt, of course, would be one made entirely of rubber or other elastomer. However, due to stresses on the belt, it has been necessary to reinforce the belt with a ply of fabric, preferably tough textile fabric such as polyester or rayon.

Since the introduction of gravimetric feeder systems in the 1950's, manufacturers have insisted that in order to maintain ±0.5 percent accuracy (i.e., precision or repeatability) the operator of the feeder should only use an endless belt, i.e., a belt having no mechanical splice. The major concern with belts having a mechanical splice was the damage and inaccuracies that the impact of a splice would inflict on the weighing platform, i.e., the weigh roll and load cell. However, most feeder operators have objected to the cost and down-time associated with the replacement of an endless belt and, therefore, have used spliced belts in place of endless belts.

There are a variety of spliced belts currently on the market, all of which have various deficiencies as will be discussed hereafter. The present inventors have studied spliced belts and their effect on feeder accuracy. The first thing that the inventors observed was that belts were frequently difficult to 'track.' In some cases, the belts were longer on one side than the other, i.e., a conic section rather than a cylindrical section. Still other belts exhibited a lack of uniformity in the carcass ply, thus exhibiting puckering along their length or variations in straightness of the edge compared to its tracking centerline. Another important problem that had to be resolved was the drift of the v-guide located on the bottom along the centerline of travel of the belt. The v-guide of a belt with this condition rides up and out and then down and into the groove in either head or tail pulleys or both, thus shifting the distribution of belt tension. The present inventors discovered that feeders with belts exhibiting these conditions were difficult (or impossible) to calibrate and, in general, would not hold their calibration, even for a short time.

Another thing that the present inventors discovered about spliced belts was that the weight measured during a tare calibration cycle was not the weight of the belt alone but the superposition of the weight and the loadings due to moments transmitted through the belt by virtue of its stiffness and heterogeneity. This 'apparent weight' of the belt has always been greater than the belt's scale weight, ranging from a high of 12 to 15% greater for old or 'other source' belts to a present day low of 1% for the single ply spliced belt of the present invention. The present inventors also discovered that many things effected the apparent weight of a belt and on some belts the weight shifted wildly. The more uniform the belt, however, the less variation in apparent weight was observed.

The most desirable of belts would incorporate significant flexibility, tracking ability and homogeneity, maintain the original tensile strength (such as that exhibited in conventional endless belts), wear resistance (or wear life), and cost.

Conventional two ply belts have been used for many years and were made flexible by maintaining the thickness to around 0.31 inches. Rayon appeared to be the ideal carcass fabric due to its flexibility. But rayon presented problems to some belt manufacturers and polyester eventually became the fabric of choice. The specified belt thickness became a compromise between flexibility and wear-life; wear-life being a direct consequence of the rubber thickness between the fabric ply and the load carrying surface of the belt.

The typical construction of a two ply belt consisted of two 100 pound per inch fabric plies (approximately $1/32$ of an inch thick) connected by a strip of rubber (approximately $3/64$ of an inch thick) and covered on the bottom of the belt by $1/16$ of an inch thick rubber and on the top by $5/32$ of an inch of rubber. The two fabric plies with the $3/64$ of an inch of rubber disposed therebetween behaves like a beam and adds to the stiffness of the belt.

FIG. 1 depicts a conventional spliced belt. The splice is accomplished by cutting a belt section to length from a roll of pre-vulcanized rubber belting. The belt is cut as squarely as possible and the fastener applied over the ends and stapled or riveted in place, as shown in FIG. 1. Hence, instead of the fastener laying flush to the surface of the belt, it instead forms a lump on each side of the belt, thereby interfering with the belt as it travels over the weigh rollers. Therefore, when a spliced belt moves through a gravimetric feeder, the protruding fastener plates rapidly wear down the feeder belt cleaner (i.e., scraper) contacting the top surface of the belt near the feeder discharge. The protruding fastener plate on the bottom of the belt causes the following problems: (a) it lifts the load as it passes over each of the three rolls in the weigh plane; and (b) it impacts the weigh roll in the process of moving up and over the roll. In addition, such a spliced section may cause discontinuity in belt flexibility at the junction of the two spliced halves.

Tests have demonstrated that the error which results from the lifting of the load as it passes over each of the three rolls in the weigh plane is constant only for a belt that exhibits a homogeneous distribution of tension across the belt. This will be the case only if the belt were designed and manufactured knowing the importance of a uniformly distributed belt tension. The error caused by impact to the weigh roll in the process of moving up and over the roll is a function of belt velocity. Hence, it is not constant and adds to the feeders repeatability error. The error which arises due to the discontinuity in belt flexibility derives from spikes in the apparent weight at the moment the splice aligns with the centerline of each of the three rollers of the weigh platform. The spike has been shown to be a linear function of belt tension. Spikes generated at either support roll are negative, opposite in sign and of smaller magnitude than the spike generated at the weigh roll. Various belts have been tested where the degree of canceling of the spikes varies with time and belt tension, hence, it is not constant and adds to the feeders repeatability error.

Even in a belt so reinforced, particularly one having a joint characterized as a "hinged joint", failures of the belt at the joint have been a possibility. Such failures can result from the "comb out" of the belt fastener staples through the textile fabric.

By way of further explanation, a hinged joint on a belt is a mechanical joint often used where the belt cannot be merely slipped over the ends of its pulley and must be assembled in situ. Typically, it is made by cutting the belt to length and then applying to each end a row of belt fasteners. Such belt fasteners are commercially available and well known in the art disclosed, for instance, in the U.S. Pat. No. 5,234,101 to Herold issued Aug. 10, 1993. Such a fastener comprises a U-shaped element having a bight with a belt-engaging apertured plate on either side. The joint staples are driven through the plates, piercing the belt, including the carcass ply thereinside.

Under stress there is a possibility that the staples will pull or comb out longitudinally of the belt through the fabric, much as a comb is drawn through the hair. Hence, the term "comb out". This will result in belt failure at the joint.

To deal with the "comb out" risk in the past, continuous multiple carcass plies have been used. For example, a joint in accordance with the prior art is shown in FIG. 1. Belt 1 comprises a pair of load carrying plies 2 and 3 having a layer of rubber 11 disposed therebetween. Belt ends 4 and 5 are cut off and on each is installed a row of belt fasteners 6. Belt fasteners 6 are of U-shape having a loop 7 and two plates (8, 9). Plates (8, 9) are apertured and receive staples 101 which pierce belt 1 including carcass plies 2 and 3 and are clinched on the side with the exposed points. Such belts have been durable but, because of the double plies, have not been sufficiently flexible for some purposes.

There has been a need for a highly flexible belt with a hinged belt joint which can reliably withstand continually changing tension and the stress of long-term operation without the "comb out" described above. Moreover, the present inventors have determined that one ply at approximately twice the weight (i.e., strength of one 200 lbs. per inch ply versus two 100 lbs. per inch plies) would carry the same belt tension with a significant gain in flexibility not to mention that elimination of the inner rubber ply would reduce the belts thickness by at least 3/64th of an inch. The single ply spliced belt according to the present invention was considerably more flexible than the conventional two ply spliced belts and was approximately only 0.26 inches thick. The belt design of the present invention also demonstrated a much improved signature, i.e., the incremental apparent weight as indicated by the weighing platform.

Additionally, the tensile strength of the single ply belt according to the present invention was found to be equivalent to the original two ply belts. Furthermore, since the single ply belt is made of the same rubber and thickness as the two ply belts, its wear resistance remained substantially the same. Moreover, the single ply belt of the present invention tracked as well as the two ply belts and its cost to manufacture was essentially the same.

SUMMARY OF THE INVENTION

A spliced conveyer belt assembly which comprises a belt with first and second belt ends; a load carrying ply which is coextensive with the full length of the belt; first and second reinforcing plies spaced from the load carrying ply, the first and second reinforcing plies being disposed adjacent to the first and second belt ends, respectively; and a hinged joint comprising a plurality of first belt end fasteners and second belt end fasteners, wherein each belt end fastener comprises first and second apertured plates disposed respectively adjacent to the respective sides of the belt at the respective first and second belt ends, and a bight capable of connecting the first apertured plate to second apertured plate; at least one securing means which is capable of extending through the apertures in the first and second apertured plates and through the belt; and a hinge pin extending through the bights of the first and second belt end fasteners.

The invention produces a belt which is extremely flexible throughout its length but is also extremely resistant to the above-described "comb out" of the securing means (e.g., staples or rivets) longitudinally through the end of the belt.

Preferably, the bights on the first and second belt end fasteners are interdigitated. The apertured plate is disposed opposite an associated reinforcing ply such that its top surface is flush with the exterior surface of the belt. The second apertured plate is disposed opposite the load carrying ply such that its bottom surface is contained within the second elastomeric layer of the belt.

Additionally, a first elastomeric layer may be disposed between the load carrying ply and the reinforcing plies, wherein the first elastomeric layer also acts to encapsulate the first and second reinforcing plies, and a second elastomeric layer may be disposed about the surface of the load carrying ply opposite the first and second reinforcing plies.

The load carrying ply is located between about 30 to 40% of the distance between the bottom and top surfaces of the belt. The first and second elastomeric layers account for about 50% and 25% of the entire thickness of the belt, respectively. Preferably, the reinforcing plies are about half as thick as the load carrying ply and is located at between about 15 to 40% of the way down from the top surface of the belt. Moreover, the reinforcing ply extends longitudinally away from its respective securing means about 2½ to 3 times the length of the aperture plate. The end of each reinforcing ply remote from the respective belt ends is severed in such a way that it has a jagged edge having plurality of oppositely disposed angles positioned side-by-side.

The load carrying ply is about 90 to 110% stronger than the reinforcing ply. For example, the strength of the load carrying ply is preferably between about 180 to 220 pounds per inch and the strength of the reinforcing ply is preferably between about 90 to 110 pounds per inch.

The first and second aperture plates of each belt end fastener are preferably bent at an angle near their extremities inward towards the belt; thereby providing additional gripping of the belt end fastener to the belt.

The securing means extend through the belt end fasteners and the belt closely adjacent the distal end of the apertured plates of the respective belt end fasteners.

Alternative embodiments of the spliced conveyer belt according to the present invention include (1) belts where the load carrying ply is treated with a bonding agent which is capable of causing bonding to occur between the warp and woof of the load carrying ply, (2) belts where each end of the load carrying ply is bent over on itself, thereby doubling the strength of the load carrying ply at its end, and (3) belts where each end of the load carrying ply is heat sealed, thereby causing bonding to occur between the warp and/or woof of the ply ends. Further objects and features of the invention will be apparent from a review of the following specification including the drawings, all of which disclose a non-limiting embodiment of the invention.

DESCRIPTION OF THE PREFERRED EMBODIMENT

Figure 1:
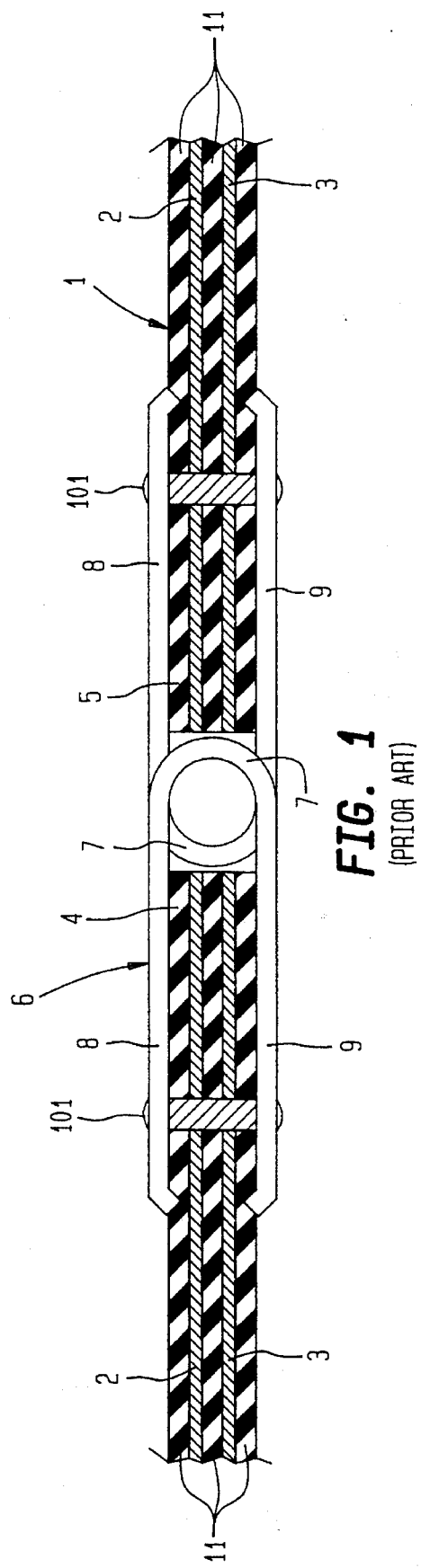
FIG. 1 is a fragmentary longitudinal section of a belt having a hinged joint as known in the prior art.
Figure 2:
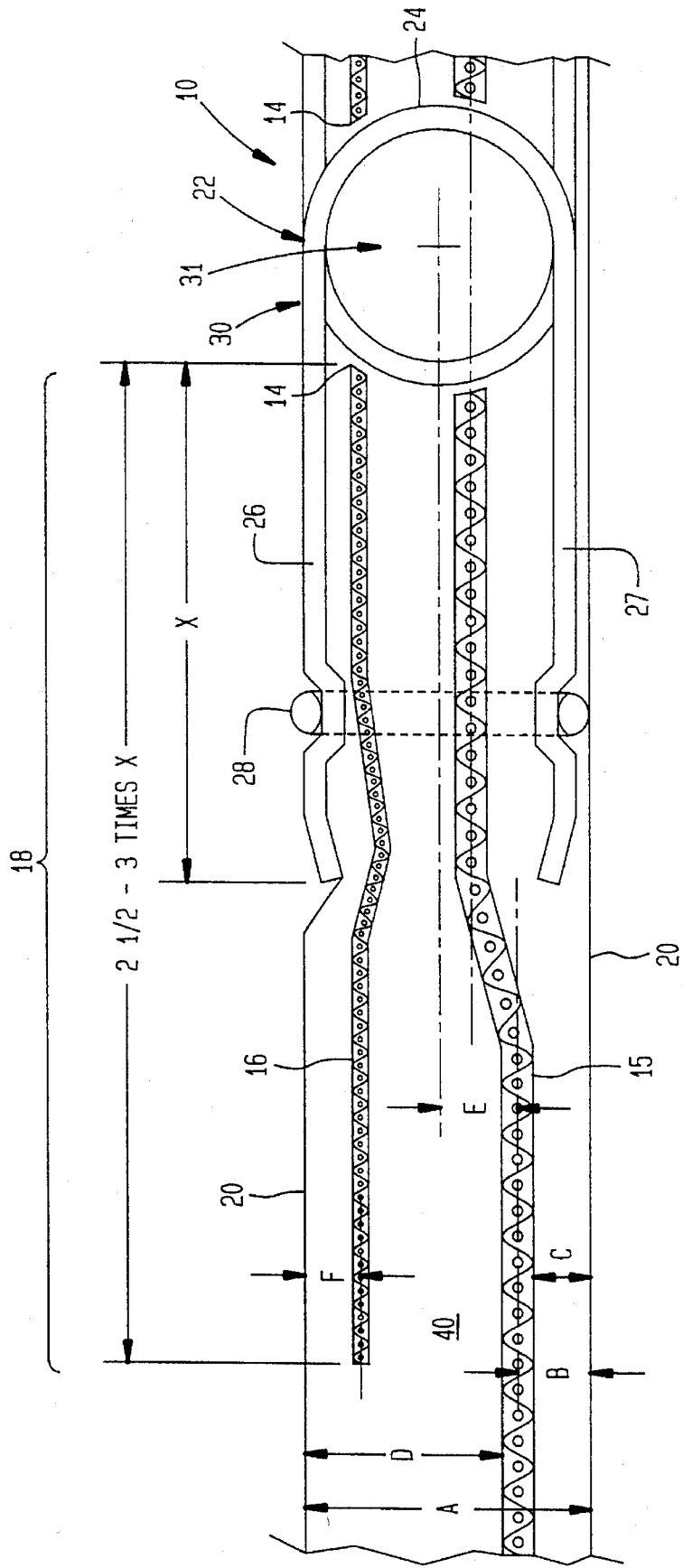
FIG. 2 is a fragmentary longitudinal sectional view of a belt having a joint embodying the present invention.

A portion of a belt 10 having a hinge joint 30 and pin 31, and embodying the invention is shown in FIG. 2. Belt 10 comprises two belt ends 14 to define the focus of hinge joint 30. Belt 10, as shown, comprises a single load carrying ply 15 which may be a woven textile fabric coated with adhesive and covered with a rubber or synthetic elastomer.

An essential of the present invention is a pair of reinforcing plies 16, also of woven fabric, which are disposed about opposite sides of hinge joint 30 and extend only over a portion of belt 10. The length of each reinforcing ply 16 is selected to only extend beyond staple 28 for a distance of approximately 2½ to 3 times the length of the aperture plate, such that reinforcing ply 16 has minimal effect on the flexibility of belt 10.

Belt 10 is encapsulated within layer of rubber 20 coated on the outside surfaces and bonded to single load carrying ply 15 such that layer of rubber 20 may account for between about 4 to 50% of the thickness of belt 10. A layer of rubber 40 also extends between continuous ply 15 and reinforcing ply 16. Preferably, rubber layers 20 and 40 are vulcanized to continuous ply 15 and reinforcing ply 16 to form a compact strong joint therebetween.

Belt 10, shown in FIG. 2, was developed by the present inventors such that its various physical characteristics have little or no influence on a gravimetric feeder's weighing accuracy. One particularly important physical characteristic is the fact that the top surface of fastener plate 26 is flush with the top boundary of belt 10, while the bottom surface of fastener plate 27 is contained within the bottom boundary of belt 10. The centerline of load carrying ply 15 is located about 36% (B) of the distance (A) between the bottom and top of belt 10. Top and bottom rubber layer or skin 20 accounts for about 50% (D) and 25% (C), respectively, of the thickness of belt 10. Reinforcing ply 16 (i.e., breaker strip) is about half as thick as load carrying ply 15 and is located at about 15 to 40% (F) of the way down from the top surface of belt 10.

Fastener plates 26 and 27 extend over belt 10 and are stapled away from hinge 30 a distance of between about 2½ to 3 times the thickness of belt 10, where 3 times the thickness of belt 10 is preferred. Fastener plates 26 and 27 are bent near their extremities so as to provide additional gripping as they bite into the surface of belt 10. Staples 28 are oversized relative to those used in the prior art and clinched prior to vulcanization of belt 10. The tensile force transferred through belt end fastener 22 to the belt's textile ply 15 is accomplished through the engagement of staples 28 into load carrying ply 15 and reinforcing ply 16, and from reinforcing ply 16 through rubber layer 40 to the bottom load carrying ply 15; and through rubber layer 20 formed by vulcanization under fastener plate 26 and around fastener plate 27 that is vulcanized thereto.

In the construction of joints 30, a row of belt end fasteners 22 are applied to each belt end 14. Belt end fasteners 22 each preferably comprise a U-shaped element or bight 24 and fastener plates 26 and 27 on either side which are structured to rest flat against the opposite faces of belt ends 14. Fastener plates 26 and 27 are apertured. Staples 28 are then applied with their tines extending through the apertures and through belt 10, including the fabric of load carrying ply 15 and reinforcing ply 16. The tines of staples 28 are clinched over at their pointed ends in a manner well known in the art.

Figure 4:
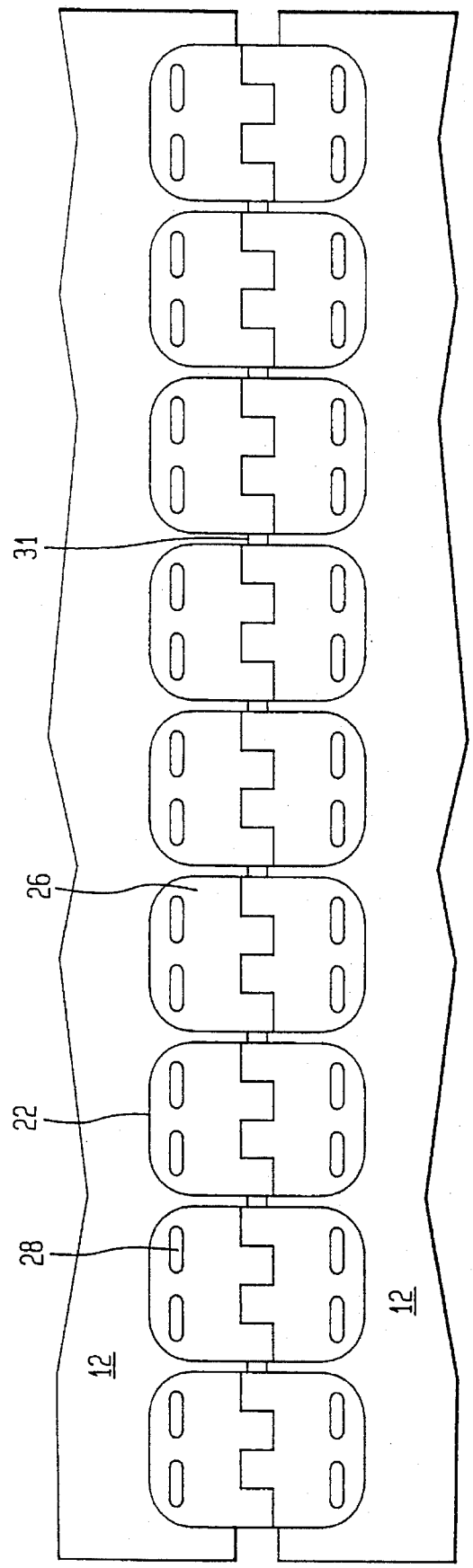
FIG. 4 is a fragmentary top plan view of a joint embodying the present invention.

Finally, U-shaped elements or bights 24, which are in the form of double loops in belt end fasteners 22, shown in FIG. 4, are interdigitated and a hinge pin or splice wire 31 is threaded through U-shaped elements or bights 24 in a well-known manner.

In the preferred embodiment, the apertures in belt end fasteners 22 are formed as close as reasonably possible to the distal ends of fastener plates 26 and 27, i.e., away from the loops of belt end fasteners 22. This provides a greater length of "beef" of carcass plies 15 and 16 to absorb the pulling tension of staples 28. In addition, staples 28 are preferably selected to as large a diameter as is practical. In an actual installation, belt end fasteners 22 are Flexco model 187 fasteners and staples 28 are Flexco 310 staples.

It has been found that reinforcing carcass ply 16 may constitute sufficient reinforcement even if it is not as strong as load carrying ply 15. For instance, in an actual construction, load carrying ply 15 may have a strength of 200 pounds per inch, while the material of reinforcing carcass ply 16 may have a strength of 100 pounds per inch.

Figure 3:
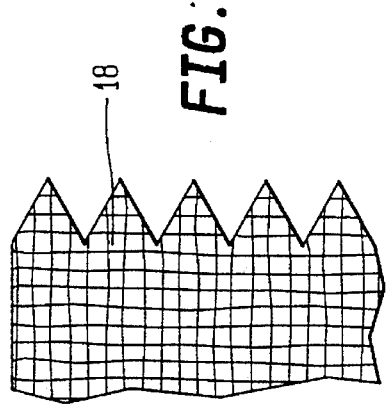
FIG. 3 is a fragmentary enlarged sectional view of the jagged edge of the end of each reinforcing ply furthest from the hinge joint of FIG. 2.

Preferably, the cut-off of reinforcing carcass ply 16 at its remote end from joint 30 is made with pinking shears so that a zig-zag cut of ply 16 (FIG. 3) is effected, whereby the ply threads preferably traverse across and along the belt width. It has been found that this distributes stresses over a greater area and, thus prevents the rubber from cracking and breaking at the end of the reinforcing carcass ply 16.

The present invention meets the need for a hinged joint 30 having great resistance to "comb out" and, at the same time, a belt that is more flexible than prior belts having similar joint durability. Such flexibility will be especially appreciated in structure when the belt is used in a weighing function.

The novel spliced single ply belt 10 of the present invention contains several compromises in both strength and accuracy. Ideally, load carrying ply 15 would be placed on a line of action that would pass through the center of rotation of belt end fastener 22. The offset (E), as shown in FIG. 2, introduces a moment such that when tension is applied to belt 10, the center of rotation of belt end fastener 22 will move so as to align with the tensile vectors, thus, distorting belt end fastener 22 downward along its vertical centerline. This distortion forms a bump that is tension sensitive and therefore, introduces a new source for potential weighing error.

For greatest strength load carrying ply 15 must be as far away as possible from the unsupported center of staple 28 such that the moment created between the point of contact on staple 28 and either fastener plate 26 or 27 is minimized. Staples 28 applied to a centered configuration have failed by bending and pulling out of belt end fastener 22, thus, permitting the splice to fail. As a result of these tests, and knowing that locating load carrying ply 15 immediately adjacent to fastener plate 27 would be difficult to do, staple 28 was changed to one with greater cross-section, hence, greater strength. Moving load carrying ply 15 to the centerline of belt 10 also reduces the upper rubber thickness needed to extend the wear life of belt 10. Reinforcing ply 16 aids by sharing some of the tension, thus strengthening the splice while producing a moment counter to that produced through offset E and helps to stabilize joint 30.

Finally, the bottom surface of belt 10 is covered with a thin layer of rubber 20 (i.e., 0.01 inches thick) which aids in maintaining a smooth approach and retreat as it passes over the weigh roll of the gravimetric feeder system, not shown. Preferably, layer of rubber 20 is reinforced with a layer of fabric that is thinner than reinforcing ply 16. When belt 10 is vulcanized, the inner circumference of belt end fastener 22 which normally holds splicing wire 31 (or rod) is filled with a rod of the same diameter that is easily removed after vulcanization. This serves to permit rubber to fill all the open spaces which would, otherwise, permit fine coal particles to fall through belt 10, thus, unnecessarily contaminating the bottom surface of belt 10.

Figure 5A:
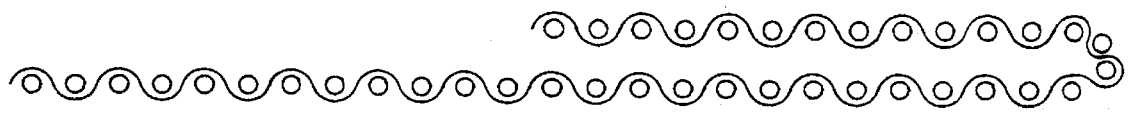
FIG. 5a is a cross-section of a load carrying ply wherein each ply end is bent over on itself.
Figure 5B:
FIG. 5b is a cross-section of a load carrying ply which has been treated with a bonding agent.
Figure 5C:
FIG. 5c is a cross-section of a load carrying ply which has been heat sealed.

Many alternatives for the prevention of 'comb out' were conceptualized by the present inventors and some were tried with good results. Most were discarded due to the ease of manufacturing of reinforcing ply 16. Alternatives included treating load carrying ply 15 chemically to cause bonding to occur between warp and woof (See FIG. 5(*c*)). Such a bond would prevent 'comb out'. In addition, bending the end one inch or so of the textile ply 15 over on itself, thus, achieving two 200 lbs. per inch under the fastener and a trap for the woof (i.e., lateral) yarn (See FIG. 5(*a*)). In other words, the woof can not move without opening belt end fastener 22 outward. Finally, the same ends can be met by cutting the polyester textile ply 15 using a hot knife. In so doing, the end of the warp yarns would bond and in some cases may also bond to the outermost woof yarn, again preventing 'comb out' (See FIG. 5(*b*)).

While the invention is shown in one embodiment, it is limited only by the following claim language which may be extended by an enlargement of the right to exclude as is appropriate under the doctrine of equivalents.

What is claimed is:

1. A spliced conveyer belt assembly which comprises:
   a belt comprising: first and second belt ends; a load carrying ply which is coextensive with the full length of said belt; first and second reinforcing plies spaced from said load carrying ply, said first and second reinforcing plies being disposed substantially adjacent to said first and second belt ends, respectively; a first elastomeric layer disposed between said load carrying ply and said reinforcing plies, wherein said first elastomeric layer also acts to encapsulate said first and second reinforcing plies; and a second elastomeric layer disposed about the surface of said load carrying ply opposite said first and second reinforcing plies; and
   a hinged joint comprising: a plurality of first belt end fasteners and second belt end fasteners, wherein each said belt end fastener comprises first and second apertured plates disposed respectively adjacent to the respective sides of said belt at the respective first and second belt ends, and a bight capable of connecting said first apertured plate to second apertured plate; at least one securing means which is capable of extending through the apertures in said first and second apertured plates and through said belt; and a hinge pin extending through said bights of said first and second belt end fasteners.

2. A spliced conveyer belt assembly according to claim 1 wherein said bights on said first and second belt end fasteners are interdigitated.

3. A spliced conveyer belt assembly according to claim 1 wherein said load carrying ply and said reinforcing plies are formed from a fabric.

4. A spliced conveyer belt assembly according to claim 3 wherein said fabric is either rayon or polyester.

5. A spliced conveyer belt assembly according to claim 1 wherein said first apertured plate is disposed opposite an associated reinforcing ply such that its top surface is flush with the exterior surface of said belt.

6. A spliced conveyer belt assembly according to claim 1 wherein said second apertured plate is disposed opposite said load carrying ply such that its bottom surface is contained within said second elastomeric layer of said belt.

7. A spliced conveyer belt assembly according to claim 1 wherein said load carrying ply is located between about 30 to 40% of the distance between the bottom and top surfaces of said belt.

8. A spliced conveyer belt assembly according to claim 1 wherein said first and second elastomeric layers account for about 50% and 25% of the entire thickness of said belt, respectively.

9. A spliced conveyer belt assembly according to claim 1 wherein said reinforcing plies are about half as thick as said load carrying ply and are located at between about b 15to 40% of the way down from the top surface of said belt.

10. A spliced conveyer belt assembly according to claim 1 wherein said reinforcing ply extends longitudinally away from its respective securing means about 2½ to 3 times the length of said aperture plate.

11. A spliced conveyer belt assembly according to claim 1 wherein said securing means is either a staple or rivet.

12. A spliced conveyer belt assembly according to claim 1 wherein said first and second aperture plates of each said belt end fastener are bent at an angle near their extremities inward towards said belt; thereby providing additional gripping of said belt end fastener to said belt.

13. A spliced conveyer belt assembly according to claim 1 wherein the end of each of said reinforcing ply remote from the respective belt ends is severed in such a way that it has a jagged edge having plurality of oppositely disposed angles positioned side-by-side.

14. A spliced conveyer belt assembly according to claim 1 wherein said load carrying ply is about 90 to 110% stronger than said reinforcing ply.

15. A spliced conveyer belt assembly according to claim 1 wherein the strength of said load carrying ply is between about 180 to 220 pounds per inch and the strength of said reinforcing ply is between about 90 to 110 pounds per inch.

16. A spliced conveyer belt assembly according to claim 2 wherein said bight of each said belt end fastener comprises a plurality of spaced aligned loops and the loops of said interdigitated belt end fasteners.

17. A spliced conveyer belt assembly according to claim 1 wherein said second elastomeric layer accounts for between about 4 to 50% of the thickness of said conveyer belt.

18. A spliced conveyer belt assembly which comprises:
   a belt comprising: first and second belt ends; a load carrying ply which is coextensive with the full length of said belt and having first and second ply ends which are coextensive with said first and second belt ends, respectively, wherein each said ply end is bent over on itself, thereby doubling the strength of said load carrying ply at said ply end; and a hinged joint comprising: a plurality of first belt end fasteners and second belt end fasteners, wherein each said belt end fastener comprises first and second apertured plates disposed respectively adjacent to the respective sides of said belt at the respective first and second belt ends, and a bight capable of connecting said first apertured plate to second apertured plate; at least one securing means which is capable of extending through the apertures in said first and second apertured plates and through said belt and said doubled up portion of said load carrying ply; and a hinge pin extending through said bights of said first and second belt end fasteners.

* * * * *